(12) United States Patent
Zhou

(10) Patent No.: US 9,888,269 B2
(45) Date of Patent: Feb. 6, 2018

(54) DEVICE AND METHOD FOR DISPLAYING A VIDEO OVER A NETWORK

(71) Applicant: HISENSE MOBILE COMMUNICATIONS TECHNOLOGY CO., LTD., Qingdao (CN)

(72) Inventor: Hua Zhou, Qingdao (CN)

(73) Assignees: HISENSE MOBILE COMMUNICATIONS TECHNOLOGY CO., LTD., Qingdao (CN); HISENSE USE CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/296,555

(22) Filed: Oct. 18, 2016

(65) Prior Publication Data

US 2017/0164024 A1    Jun. 8, 2017

(30) Foreign Application Priority Data

Dec. 3, 2015  (CN) .......................... 2015 1 0888758

(51) Int. Cl.
*H04N 7/173* (2011.01)
*H04N 21/2343* (2011.01)
(Continued)

(52) U.S. Cl.
CPC . *H04N 21/234363* (2013.01); *H04N 21/4126* (2013.01); *H04N 21/4223* (2013.01); *H04N 21/4312* (2013.01); *H04N 21/44008* (2013.01); *H04N 21/440263* (2013.01); *H04N 21/6125* (2013.01); *H04N 21/6131* (2013.01)

(58) Field of Classification Search
CPC ....... H04N 21/234363; H04N 21/4126; H04N 21/4223; H04N 21/4312; H04N 21/44008; H04N 21/440263; H04N 21/6125; H04N 21/6131
See application file for complete search history.

(56) References Cited

U.S. PATENT DOCUMENTS 6,313,822 B1 *  11/2001  McKay ..................... G06F 3/14
                                                                345/545
9,686,504 B2 *   6/2017  Chang .................. H04N 7/0117
(Continued)

*Primary Examiner* — Oleg Asanbayev
(74) *Attorney, Agent, or Firm* — Harness, Dickey & Pierce, P.L.C.

(57) ABSTRACT

Disclosed are a device and method for displaying a video over a network, the method includes: determining a first resolution of a target video frame input over network, and comparing the first resolution with a screen resolution of a mobile terminal, and the first resolution with a resolution of a video frame displayed by the mobile terminal; if the first resolution is different from the screen resolution of the mobile terminal, determining a first ratio of a row resolution of the screen resolution to a row resolution of the first resolution, and a second ratio of a column resolution of the screen resolution to a column resolution of the first resolution; determining the size of a display window according to the smaller one of the first ratio and the second ratio, which is a display scale, and the first resolution; and displaying the target video frame in the display window.

15 Claims, 5 Drawing Sheets

(51) Int. Cl.
  *H04N 21/431*  (2011.01)
  *H04N 21/44*   (2011.01)
  *H04N 21/61*   (2011.01)
  *H04N 21/41*   (2011.01)
  *H04N 21/4223* (2011.01)
  *H04N 21/4402* (2011.01)

(56) References Cited

U.S. PATENT DOCUMENTS

| | | | |
|---|---|---|---|
| 2006/0017852 A1* | 1/2006 | Iwaki | G06T 3/40 |
| | | | 348/581 |
| 2007/0056000 A1* | 3/2007 | Pantalone | H04N 21/234327 |
| | | | 725/90 |
| 2010/0185995 A1* | 7/2010 | Pikus | G06F 17/5081 |
| | | | 716/111 |
| 2013/0050585 A1* | 2/2013 | Chang | G06F 1/1632 |
| | | | 348/734 |

* cited by examiner

DEVICE AND METHOD FOR DISPLAYING A VIDEO OVER A NETWORK

CROSS-REFERENCE TO RELATED APPLICATION

This application claims the benefit and priority of Chinese Patent Application No. 201510888758.8 filed Dec. 3, 2015. The entire disclosure of the above application is incorporated herein by reference.

FIELD

The present disclosure relates to the field of wireless communications, and particularly to a device and method for displaying video images over a network in Voice over Long Term Evolution (VoLTE) voice communication over the network.

BACKGROUND

This section provides background information related to the present disclosure which is not necessarily prior art.

As the wireless network technologies are developing constantly, high-definition voice communication and video communication can be conducted on a terminal due to the improvement of the mobile network, and the support by a terminal chip. Particularly the aspect of video communication offers a brand-new communication experience of a user customized based upon the wireless network, the terminal chip, and a User Interface (UI). Taking 4G network as an example, in video communication, a calling mobile terminal and a called mobile terminal need to negotiate about the size, the format, and the frame rate of video transmission according to their video capabilities, and a network condition, to package their voice and video data using their cameras to record their videos, and to transmit the data to each other over the LTE network. Since video communication over the VoLTE network has a guaranteed Quality of Service (QoS) at the operator telecommunication level, video communication can be initiated similarly to a normal call by phone, and there is a better experience of the user in comparison to a third-party video chatting application.

SUMMARY

This section provides a general summary of the disclosure, and is not a comprehensive disclosure of its full scope or all of its features.

Some embodiments of the disclosure provide a mobile terminal including:

a resolution determining unit configured to determine a first resolution of a target video frame input over a network, and to compare the first resolution with a screen resolution of the mobile terminal, and the first resolution with a resolution of a video frame currently displayed by the mobile terminal;

a scaling factor determining unit configured, when the first resolution is different from the screen resolution of the mobile terminal, to determine a first ratio of a row resolution of the screen resolution of the mobile terminal to a row resolution of the first resolution, and a second ratio of a column resolution of the screen resolution of the mobile terminal to a column resolution of the first resolution;

a display window determining unit configured to determine size of a display window according to the smaller one of the first ratio and the second ratio, which acts as a display scale, and the first resolution; and a displaying unit configured to display the target video frame in the display window.

Some embodiments of the disclosure further provide a mobile terminal including:

a camera unit configured to acquire an image;

a resolution determining unit configured to determine an image acquisition resolution of the camera unit according to a first resolution of a target video frame input over a network;

a scaling factor determining unit configured, to determine a third ratio of a row resolution of a resolution of a local video preview window to a row resolution of the image acquisition resolution, and a fourth ratio of a column resolution of the resolution of the local video preview window to a column resolution of the image acquisition resolution;

a display window determining unit configured to determine size of the local video preview window according to the smaller one of the third ratio and the fourth ratio, and the image acquisition resolution; and a displaying unit configured to display the image acquired by the camera unit in the local video preview window.

Some embodiments of the disclosure provide a method for displaying a video over a network, the method includes:

determining a first resolution of a target video frame input over the network, and comparing the first resolution with a screen resolution of a mobile terminal, and the first resolution with a resolution of a video frame currently displayed by the mobile terminal;

when the first resolution is different from the screen resolution of the mobile terminal, determining a first ratio of a row resolution of the screen resolution of the mobile terminal to a row resolution of the first resolution, and a second ratio of a column resolution of the screen resolution of the mobile terminal to a column resolution of the first resolution;

determining size of a display window according to the smaller one of the first ratio and the second ratio, which acts as a display scale, and the first resolution; and displaying the target video frame in the display window.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In some embodiments of the disclosure, a mobile terminal may be a wireless terminal, or may be a wired terminal, for example, the mobile terminal may be a mobile phone, a computer, a tablet computer, a Personal Digital Assistant (PDA), a Mobile Internet Device (MID), a wearable device, an e-book reader, etc.

In some embodiments of the disclosure, an image resolution of a target video frame, i.e., a first resolution, can be represented as a row resolution * a column resolution, where the row resolution can be the number of pixels in a row of the target video frame, and the column resolution can be the number of pixels in a column of the target video frame. For example, if the first resolution of the target video frame is 320*240, then the number of pixels in a row of the target video frame will be 320, and the number of pixels in a column of the target video frame will be 240.

In some embodiments of the disclosure, a screen resolution of the mobile terminal can be represented as a screen row resolution*a screen column resolution unless stated otherwise.

It shall be also noted that in the embodiments of the disclosure, the mobile terminal is a mobile terminal compatible of supporting and displaying a video over a network.

Figure 1:
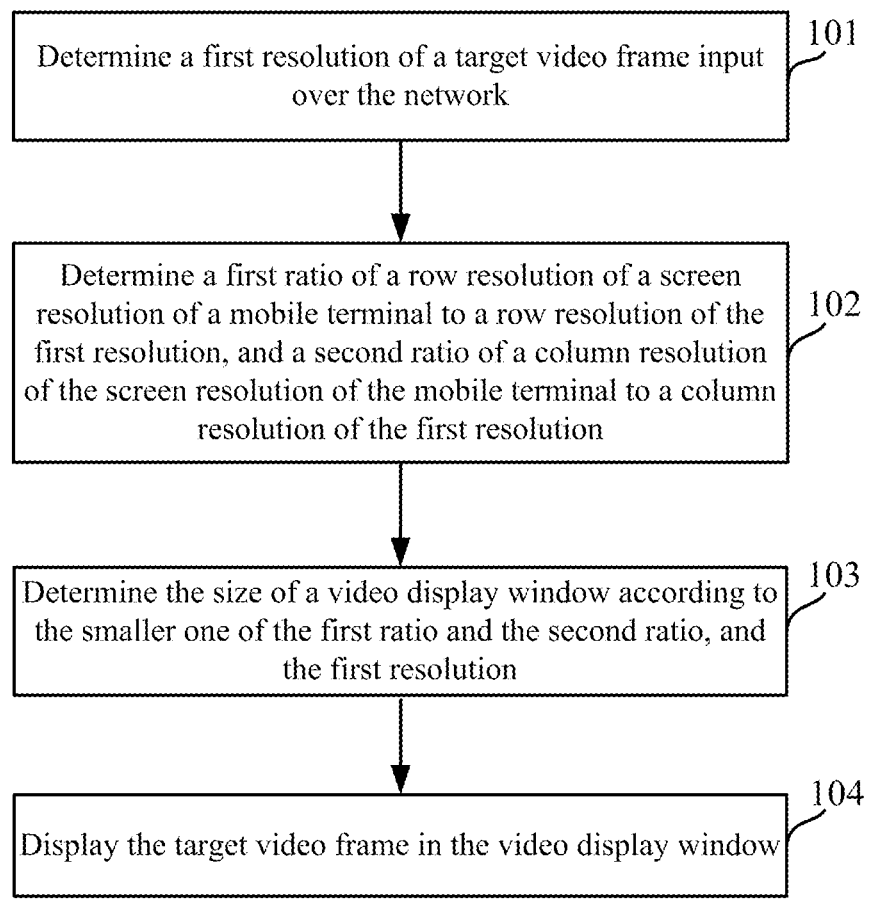
FIG. 1 is a schematic flow chart of a method for displaying a video over a network according to some embodiments of the disclosure.

As illustrated in FIG. 1, there is a schematic flow chart of a method for displaying a video over a network according to some embodiments of the disclosure.

Referring to FIG. 1, the method includes the following steps:

The step 101 is to determine a first resolution of a target video frame input over the network;

The step 102 is to determine a first ratio of a row resolution of a screen resolution of a mobile terminal to a row resolution of the first resolution, and a second ratio of a column resolution of the screen resolution of the mobile terminal to a column resolution of the first resolution;

The step 103 is to determine size of a video display window according to the smaller one of the first ratio and the second ratio, and the first resolution; and The step 104 is to display the target video frame in the video display window.

In the step 101, the target video frame input to the mobile terminal is a target video frame transmitted to the mobile terminal over the network, and the mobile terminal may be a calling mobile terminal, or may be a called mobile terminal.

For example, the first resolution of the target video frame, input over the network, obtained by the mobile terminal can be 176*144, 320*240, 640*480, 1280*720, 1920*1080, or another resolution. The resolution of the target video frame input over the network is determined by the quality of a communication signal over the network, where if there is a higher signal quality over the network, the mobile terminal will negotiate with an opposite device over the network about a higher preset resolution of the target video frame; and if there is a lower signal quality over the network, the mobile terminal will negotiate with the opposite device over the network about a lower preset resolution of the target video frame. For example, the resolution of the target video frame to be transmitted is 1280*720 in some case, and if the signal quality over the network is degraded, the mobile terminal will adjust the resolution of the target video frame to 640*480 as a result of negotiation; and if the signal quality over the network is improved, the mobile terminal will adjust the resolution of the target video frame to 1920*1080 as a result of negotiation. The mobile terminal can determine the first resolution of the target video frame according to parameters of the target video frame.

In the step 102, there is a fixed screen resolution of the display screen of the mobile terminal due to physical pixels in the display screen, but the first resolution of the input target video frame varies with the varying signal quality over the network, so the first ratio of the row resolution of the screen resolution of the mobile terminal to the row resolution of the first resolution, and the second ratio of the column resolution of the screen resolution of the mobile terminal to the column resolution of the first resolution can be determined, where the first ratio characterizes a scaling factor of the target video frame in the row direction if all the pixels in the row direction on the screen are populated with image pixels of the target video frame in the row direction; and the second ratio characterizes a scaling factor of the target video frame in the column direction if all the pixels in the column direction on the screen are populated with image pixels of the target video frame in the column direction. For example, in some embodiments, the screen resolution of the mobile terminal is 1280*720, and the first resolution of the target video frame is 640*480, that is, the row resolution of the target video frame is 640, and the column resolution of the target video frame is 480. The row resolution of the display screen of the mobile terminal is 1280, and the column resolution of the display screen of the mobile terminal is 720, so the first ratio is calculated is 1280/640=2, and the second ratio is calculated as 720/480=1.5. If the target video frame is magnified by a factor of 2, image pixels of the magnified target video frame in the row direction will be displayed on all the pixels in the row direction on the display screen, and if the target video frame is magnified by a factor of 1.5, image pixels of the magnified target video frame in the column direction will be displayed on all the pixels in the column direction on the display screen.

In some embodiments of the disclosure, since a video is played consecutively, after the target video frame is obtained, it can be firstly determined whether the first resolution of the target video frame is the same as the resolution of the currently displayed video frame, and if it is determined that the first resolution of the target video frame is the same as the resolution of the currently displayed video frame, then the target video frame will be displayed directly in a display window displaying the currently displayed video frame. If the mobile terminal determines that the first resolution of the target video frame is different from the resolution of the currently displayed video frame, then it will indicate that the current network condition is changed so that the resolution of the video frame transmitted over the network may be higher or lower, so it will not be appropriate to display the target video frame still in the display window of the currently displayed video frame, which would otherwise distort the target video frame if it were displayed. Accordingly the first ratio and the second ratio need to be determined.

In some embodiments of the disclosure, if the first resolution is the same as the screen resolution of the mobile terminal, then the target video frame will be displayed throughout the screen. If the first resolution is different from the screen resolution of the mobile terminal, then for the sake of a better display effect, the first ratio and the second ratio will be determined according to the screen resolution of the mobile terminal, and the first resolution of the target video frame to determine the size of the display window.

In some embodiments of the disclosure, the screen of some mobile terminal may be rotated in different directions dependent upon how the mobile terminal is oriented. For example, a value of a gravity sensor is detected, and a display mode of the mobile terminal is set to a portrait mode or a landscape mode; or a state in which the mobile terminal is handheld is detected, and a display mode of the mobile terminal is set to a portrait mode or a landscape mode. The screen resolution of the mobile terminal can be represented as a screen row resolution*a screen column resolution unless stated otherwise. For the sake of a convenient description, if the display mode of the mobile terminal is the landscape mode, then the screen row resolution in the current display mode of the mobile terminal will be the resolution on the longer sides of the screen of the mobile terminal, and the screen column resolution in the current display mode of the mobile terminal will be the resolution on the shorter sides of the screen of the mobile terminal; and if the display mode of the mobile terminal is the portrait mode, then the screen row resolution in the current display mode of the mobile terminal will be the resolution on the shorter sides of the screen of the mobile terminal, and the screen column resolution in the current display mode of the mobile terminal will be the resolution on the longer sides of the screen of the mobile terminal.

For example, the screen resolution of the mobile terminal is 1280*720. If the display mode of the mobile terminal is the landscape mode, then the screen row resolution in the current display mode of the mobile terminal will be 1280, and the screen column resolution in the current display mode of the mobile terminal will be 720. If the display mode of the mobile terminal is the portrait mode, then the screen row resolution in the current display mode of the mobile terminal will be 720, and the screen column resolution in the current display mode of the mobile terminal will be 1280.

Accordingly the mobile terminal in the different display modes determines different display scales of the target video frame, so the mobile terminal needs to determine the current display mode thereof before it determines the display scale of the target video frame.

After the current display mode of the mobile terminal is determined, the display scale of the target video frame can be determined in the following steps:

The step of determining the scaling factor of the target video frame in the row direction according to the screen row resolution in the current display mode of the mobile terminal, and the row resolution of the target video frame as the first ratio, particularly by dividing the screen row resolution in the current display mode of the mobile terminal by the row resolution of the target video frame to obtain the first ratio; and The step of determining the scaling factor of the target video frame in the column direction according to the screen column resolution in the current display mode of the mobile terminal, and the column resolution of the target video frame as the second ratio, particularly by dividing the screen column resolution in the current display mode of the mobile terminal by the column resolution of the target video frame to obtain the second ratio.

For example, the screen resolution of the mobile terminal is 1280*720, and the first resolution of the target video frame is 640*480, that is, the row resolution of the target video frame is 640, and the column resolution of the target video frame is 480. If the display mode of the mobile terminal is the portrait mode, then the screen row resolution in the current display mode of the mobile terminal will be 720, and the screen column resolution in the current display mode of the mobile terminal will be 1280, so the first ratio is calculated as 720/640=1.125, and the second ratio is calculated as 1280/480=2.667. If the display mode of the mobile terminal is the landscape mode, then the screen column resolution in the current display mode of the mobile terminal will be 720, and the screen row resolution in the current display mode of the mobile terminal will be 1280, so the first ratio is calculated as 1280/640=2, and the second ratio is calculated as 720/480=1.5.

In the step 103, the size of the video display window is determined according to the smaller one of the first ratio and the second ratio, and the first resolution. It is determined whether the first ratio is larger than the second ratio, and if so, then the second ratio will be determined as the smaller one of the first ratio and the second ratio; otherwise, the first ratio will be determined as the smaller one of the first ratio and the second ratio.

For example in connection with the example above, if the display mode of the mobile terminal is the portrait mode, then the smaller one of the first ratio and the second ratio will be determined as 1.125; and if the display mode of the mobile terminal is the landscape mode, then the smaller one of the first ratio and the second ratio will be determined as 1.5.

The size of the video display window is determined as the product of the smaller one of the first ratio and the second ratio, and the first resolution, that is, the smaller one of the first ratio and the second ratio is multiplied respectively with the row resolution and the column resolution in the first resolution to obtain the size of the video display window. For example, in the example above, if the display mode of the mobile terminal is the portrait mode, then the smaller one of the first ratio and the second ratio will be determined as 1.125, so the first resolution is 640*480, and then the size of the video display window is 720*540; and if the display mode of the mobile terminal is the landscape mode, then the smaller one of the first ratio and the second ratio will be determined as 1.5, so the first resolution is 640*480, and then the size of the video display window is 960*720.

In some embodiments of the disclosure, the resolution of the screen of the mobile terminal can be preset, and in order to improve the display efficiency, a mapping table of the first resolution of the target video frame to the display scale of the target video frame (i.e., the smaller one of the first ratio and the second ratio) can be created in advance, where there are display scales to which common resolutions of the target video frame are mapped in the mapping table. If the mobile terminal determines that the first resolution of the target video frame is different from the resolution of the currently displayed video frame, then the mobile terminal will further determine whether there is a display scale, to which the resolution of the target video frame is mapped, in the mapping table of the first resolution of the target video frame to the display scale of the target video frame, and if there is a display scale to which it is mapped, then the mobile terminal will determine the display scale, to which the first resolution is mapped, directly as the display scale of the target video frame.

For example, if the resolution on the longer sides of the screen of the mobile terminal is 1280, and the resolution on the shorter sides thereof is 720, then the resolution of the screen of the mobile terminal in the landscape mode will be 1280*720, and the resolution of the screen of the mobile terminal in the portrait mode will be 720*1280. The created mapping table can be as illustrated in Table 1 in which there are first resolutions of three target video frames, and display scales corresponding thereto. If the mobile terminal determines that the first resolution of the target video frame is different from the resolution of the currently displayed video frame, then the mobile terminal will determine whether there is a display scale corresponding thereto directly in Table 1.

TABLE 1

| First resolution of target video frame | Display scale in landscape mode | Display scale in the portrait mode |
|---|---|---|
| 320 * 240 | 3 | 2.25 |
| 640 * 480 | 1.5 | 1.125 |
| 1280 * 720 | 1 | 0.5625 |

In another implementation, alternatively a mapping table of the first resolution to the size of the video window can be created by creating a lookup table as depicted in Table 2.

TABLE 2

| First resolution of target video frame | The size of a display window in the landscape mode | The size of a display window in the portrait mode |
|---|---|---|
| 320 * 240 | 960 * 720 | 720 * 540 |
| 640 * 480 | 960 * 720 | 720 * 540 |
| 1280 * 720 | 1280 * 720 | 720 * 405 |

Lastly in the step 104, the target video frame is displayed in the video display window.

In some embodiments, the target video frame can be scaled according to the smaller one of the first ratio and the second ratio, and displayed in the video display window, or the target video frame can be scaled according to the size of the video window, and displayed in the video display window.

For the sake of a better display effect, in an embodiment of the disclosure, the display window can be adjusted to the middle of the screen of the mobile terminal, and then the target video frame can be displayed in the display window.

Particularly the position where the first row of pixels of the target video frame is displayed, and the position where the first column of pixels of the target video frame is displayed in the display window, in the display window can be determined as follows, so that the display window is adjusted to the middle of the screen of the mobile terminal.

The position where the first row of pixels of the target video frame is displayed is located in the X-th column of the screen in the current display mode of the mobile terminal, where X satisfies the equation of:

$$X = \frac{A - B}{2} + 1 \quad (1)$$

Where A represents the column resolution of the screen in the current display mode of the mobile terminal, and B represents the column resolution of the determined display window.

The position where the first column of pixels of the target video frame is displayed is located in the Y-th row of the screen in the current display mode of the mobile terminal, where Y satisfies the equation of:

$$Y = \frac{C - D}{2} + 1 \quad (2)$$

Where C represents the row resolution of the screen in the current display mode of the mobile terminal, and D represents the row resolution of the determined display window.

For example, the first resolution of the target video frame is 640*480. if the display mode of the mobile terminal is the landscape mode, then the screen resolution of the mobile terminal will be 1280*720, and the size of the display window determined by the mobile terminal will be 960*720, so the position where the first column of pixels of the target video frame is displayed is determined as being located in the $$\left(X = \frac{1280 - 960}{2} + 1 = 161\right)\text{-}th$$

column of the screen in the current display mode of the mobile terminal, and the position where the first row of pixels of the target video frame is displayed is determined as being located in the $$\left(Y = \frac{720 - 720}{2} + 1 = 1\right)\text{-}th$$

row of the screen in the current display mode of the mobile terminal.

If the display mode of the mobile terminal is the portrait mode, then the size of the display window determined by the mobile terminal will be 720*540, so the position where the first column of pixels of the target video frame is displayed is determined as being located in the $$\left(X = \frac{720 - 720}{2} + 1 = 1\right)\text{-}th$$

column of the screen in the current display mode of the mobile terminal, and the position where the first row of pixels of the target video frame is displayed is determined as being located in the $$\left(Y = \frac{1280 - 540}{2} + 1 = 371\right)\text{-}th$$

row of the screen in the current display mode of the mobile terminal.

In some embodiments of the disclosure, as for a video communication related video over the network, the size of a local video preview window will be adjusted as the target video frame input by the network side varies, in addition to adjusting of the size of a display window (i.e., the video display window above) on which a remote preview video (i.e., video contents of the opposite party in video communication, which are transmitted over the network) is displayed. For example, there are the following steps after the step 104:

The step of determining an image acquisition resolution of a local camera according to the first resolution of the target video frame input over the network;

The step, if the first resolution is different from the screen resolution of the mobile terminal, of determining a third ratio of a row resolution of a resolution of a local video preview window to a row resolution of the image acquisition resolution, and a fourth ratio of a column resolution of the resolution of the local video preview window to a column resolution of the image acquisition resolution;

The step of determining the size of the local video preview window according to the smaller one of the third ratio and the fourth ratio, and the image acquisition resolution; and The step of displaying an image acquired by the local camera in the local video preview window.

In video communication, the local preview video (the local video contents acquired by the camera) shall remain consistent in resolution with the remote preview video (the target video frame displayed in the video display window), so if the resolution of the target video frame transmitted from the network side is changed, then the image acquisition resolution of the camera will be reset, and in order to avoid the local preview video from being distorted, the local video preview window will also be adjusted accordingly as the resolution of the target video frame transmitted from the network side is changed. For example, if the first resolution of the target video frame input over the network is changed to 800*600, then the image acquisition resolution of the camera will be set to 800*600. The particular step in which the third and fourth ratios are determined, and the particular step in which the size of the local video preview window is determined according to the smaller one of the third ratio and the fourth ratio, and the image acquisition resolution are similar respectively to the steps 102 and 103 above, so a repeated description thereof will be omitted here.

Furthermore a display area of the local video preview window may overlap in position with a display area of the remote preview video. In order to better present the remote preview video (so as to avoid the display area of the local video preview window from excessively or completely covering the display area of the remote preview video), a weight coefficient less than 1 can be set to thereby shrink the local video preview window so that the occupied area thereof is smaller than the display area of the remote preview video.

Figure 2:
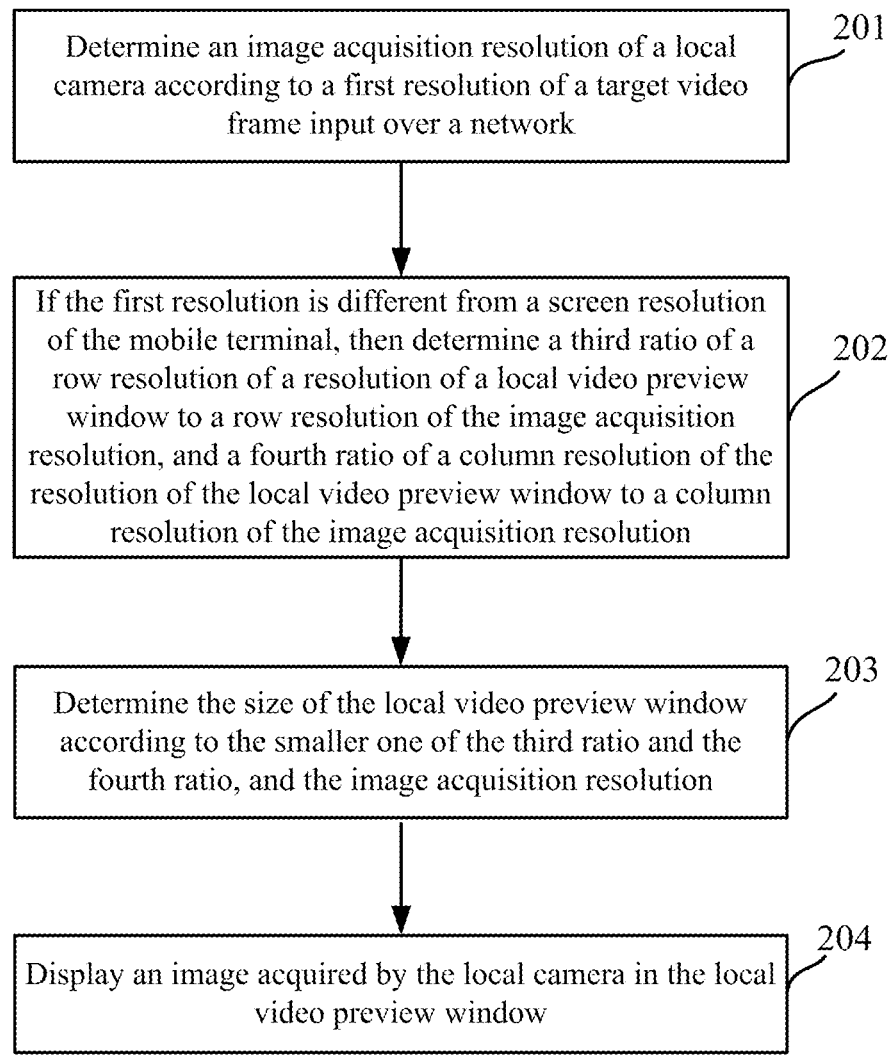
FIG. 2 is a schematic flow chart of a method for displaying a video over a network according to some embodiments of the disclosure.

In some embodiments of the disclosure, there is further provided a method for displaying a video over a network for a local video preview (e.g., a preview of a video captured by a camera). As illustrated in FIG. 2, the method includes the following steps:

The step 201 is to determine an image acquisition resolution of a local camera according to a first resolution of a target video frame input over a network;

The step 202 is, if the first resolution is different from a screen resolution of the mobile terminal, to determine a third ratio of a row resolution of a resolution of a local video preview window to a row resolution of the image acquisition resolution, and a fourth ratio of a column resolution of the resolution of the local video preview window to a column resolution of the image acquisition resolution;

The step 203 is to determine the size of the local video preview window according to the smaller one of the third ratio and the fourth ratio, and the image acquisition resolution; and The step 204 is to display an image acquired by the local camera in the local video preview window.

Here the image acquisition resolution can be set to the first resolution of the target video frame input over the network, and the particular step in which the third and fourth ratios are determined, and the particular step in which the size of the local video preview window is determined according to the smaller one of the third ratio and the fourth ratio, and the image acquisition resolution are similar respectively to the steps 102 and 103 above, so a repeated description thereof will be omitted here.

Based upon the same technical idea, an embodiment of the disclosure further provides a mobile terminal which can perform the embodiments of the methods above.

Figure 3:
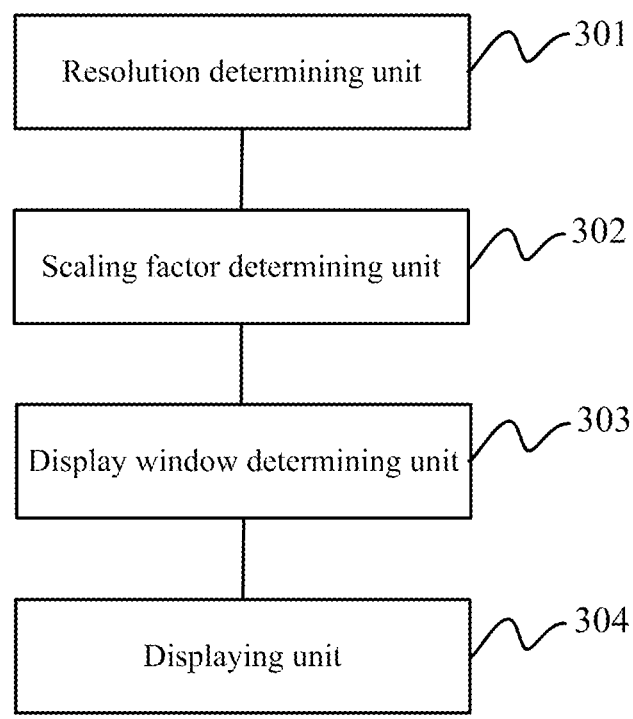
FIG. 3 is a schematic structural diagram of a mobile terminal according to some embodiments of the disclosure.

As illustrated in FIG. 3, an embodiment of the disclosure provides a schematic structural diagram of a mobile terminal, where the mobile terminal includes:

A resolution determining unit 301 is configured to determine a first resolution of a target video frame input over a network, and to compare the first resolution with a screen resolution of the mobile terminal, and the first resolution with a resolution of a video frame currently displayed by the mobile terminal;

A scaling factor determining unit 302 is configured, if the first resolution is different from the screen resolution of the mobile terminal, to determine a first ratio of a row resolution of the screen resolution of the mobile terminal to a row resolution of the first resolution, and a second ratio of a column resolution of the screen resolution of the mobile terminal to a column resolution of the first resolution;

A display window determining unit 303 is configured to determine a second resolution and a display window of the target video frame according to a display scale and the first resolution; and A displaying unit 304 is configured to display the target video frame at the second resolution in the display window.

The scaling factor determining unit 302 is configured:

To determine a scaling factor of the target video frame in the row direction according to the screen row resolution of the mobile terminal, and a row resolution of the target video frame as the first ratio, and to determine a scaling factor of the target video frame in the column direction according to the screen column resolution of the mobile terminal, and a column resolution of the target video frame as the second ratio; and To determine the smaller one of the first ratio and the second ratio as the display scale of the target video frame.

The scaling factor determining unit 302 is configured:

To determine the screen row resolution and column resolution of the mobile terminal according to the current display mode of the mobile terminal, where the display mode includes a landscape mode and a portrait mode.

The displaying unit 304 is further configured:

If it is determined that the resolution of the target video frame is the same with the screen resolution of the mobile terminal, to display the target video frame in a display window of the currently displayed video frame.

The display window determining unit 303 is configured:

To determine the product of the display scale, and the first resolution of the target video frame as the second resolution of the target video frame.

The display window determining unit 303 is configured:

To determine the product of the display scale, and the first resolution of the target video frame as the size of the display window of the target video frame; and To adjust the display to the middle of the screen of the mobile terminal.

In some embodiments of the disclosure, as for a video communication related video over the network, the mobile terminal further includes a camera unit (not illustrated), where the resolution determining unit 301 is further configured to determine an image acquisition resolution of the camera unit according to the first resolution;

The scaling factor determining unit 302 is further configured to determine a third ratio of a row resolution of a resolution of a local video preview window to a row resolution of the image acquisition resolution, and a fourth ratio of a column resolution of the resolution of the local video preview window to a column resolution of the image acquisition resolution;

The display window determining unit 303 is further configured to determine the size of the local video preview window according to the smaller one of the third ratio and the fourth ratio, and the image acquisition resolution; and The displaying unit 304 is further configured to display an image acquired by the camera unit in the local video preview window.

The scaling factor determining unit 302 is configured:

To divide the row resolution of the local video preview window in the current display mode by the row resolution of the image acquisition resolution to obtain the third ratio; and to divide the column resolution of the local video preview window in the current display mode by the column resolution of the image acquisition resolution to obtain the fourth ratio.

The scaling factor determining unit 302 is configured:

To multiply the third and fourth ratios respectively with the row resolution and the column resolution of the resolution of the local video preview window to obtain the size of the local video preview window.

Here the display mode includes a landscape display mode and a portrait display mode.

Figure 4:
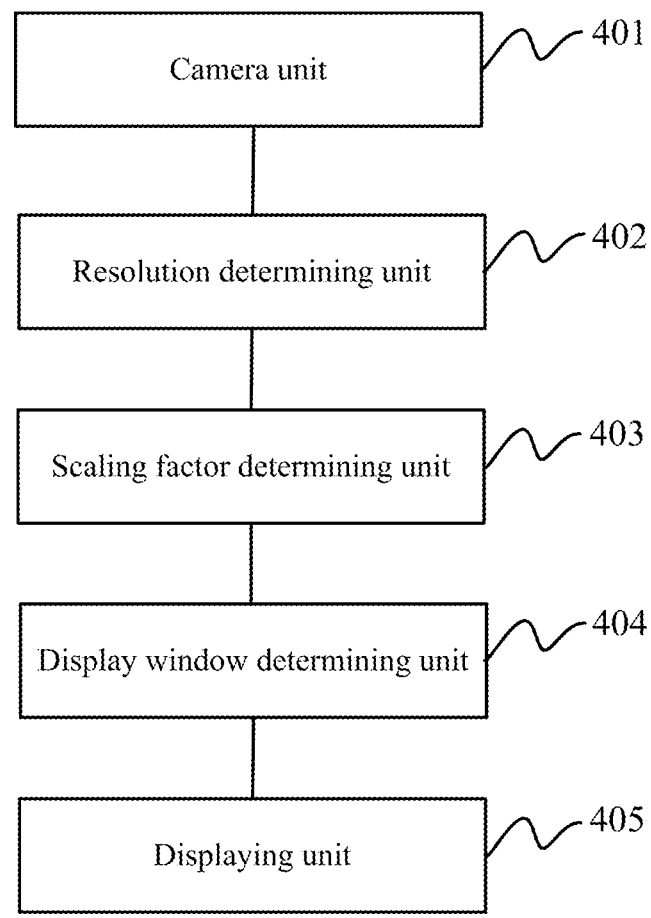
FIG. 4 is a schematic structural diagram of a mobile terminal according to some embodiments of the disclosure.

Some embodiments of the disclosure further relate to a mobile terminal for displaying a video over a network for a local video preview (e.g., a preview of a video captured by a camera). As illustrated in FIG. 4, the mobile terminal includes:

A camera unit 401 is configured to acquire an image;

A resolution determining unit 402 is configured to determine an image acquisition resolution of the camera unit 401 according to a first resolution of a target video frame input over the network;

A scaling factor determining unit 403 is configured to determine a third ratio of a row resolution of a resolution of a local video preview window to a row resolution of the image acquisition resolution, and a fourth ratio of a column resolution of the resolution of the local video preview window to a column resolution of the image acquisition resolution;

A display window determining unit 404 is configured to determine the size of the local video preview window according to the smaller one of the third ratio and the fourth ratio, and the image acquisition resolution; and A displaying unit 405 is configured to display the image acquired by the camera unit 401 in the local video preview window.

The scaling factor determining unit 403 is configured:

To divide the row resolution of the local video preview window in the current display mode by the row resolution of the image acquisition resolution to obtain the third ratio; and to divide the column resolution of the local video preview window in the current display mode by the column resolution of the image acquisition resolution to obtain the fourth ratio.

The scaling factor determining unit 403 is configured:

To multiply the third and fourth ratios respectively with the row resolution and the column resolution of the resolution of the local video preview window to obtain the size of the local video preview window.

Here the display mode includes a landscape display mode and a portrait display mode.

Figure 5:
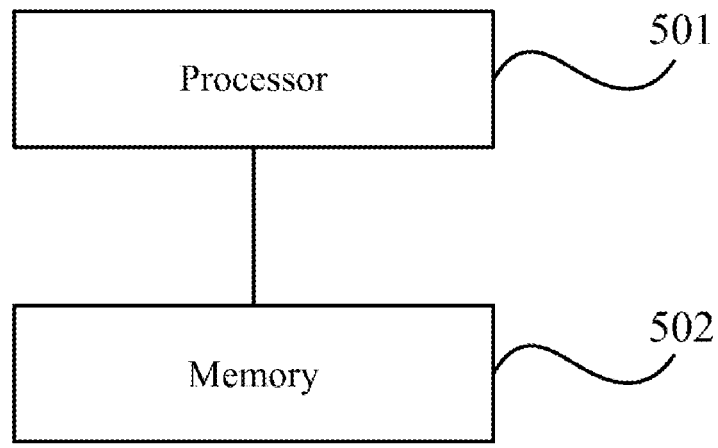
FIG. 5 is a schematic structural diagram of a mobile terminal according to some embodiments of the disclosure.

As illustrated in FIG. 5, another mobile terminal according to some embodiments of the disclosure structurally includes a nonvolatile memory 502 and one or more processors 501, where the memory 502 stores one or more computer readable program codes, and the one or more processors 501 are configured to execute the one or more computer readable program codes to perform the methods according to the embodiments above.

Figure 6:
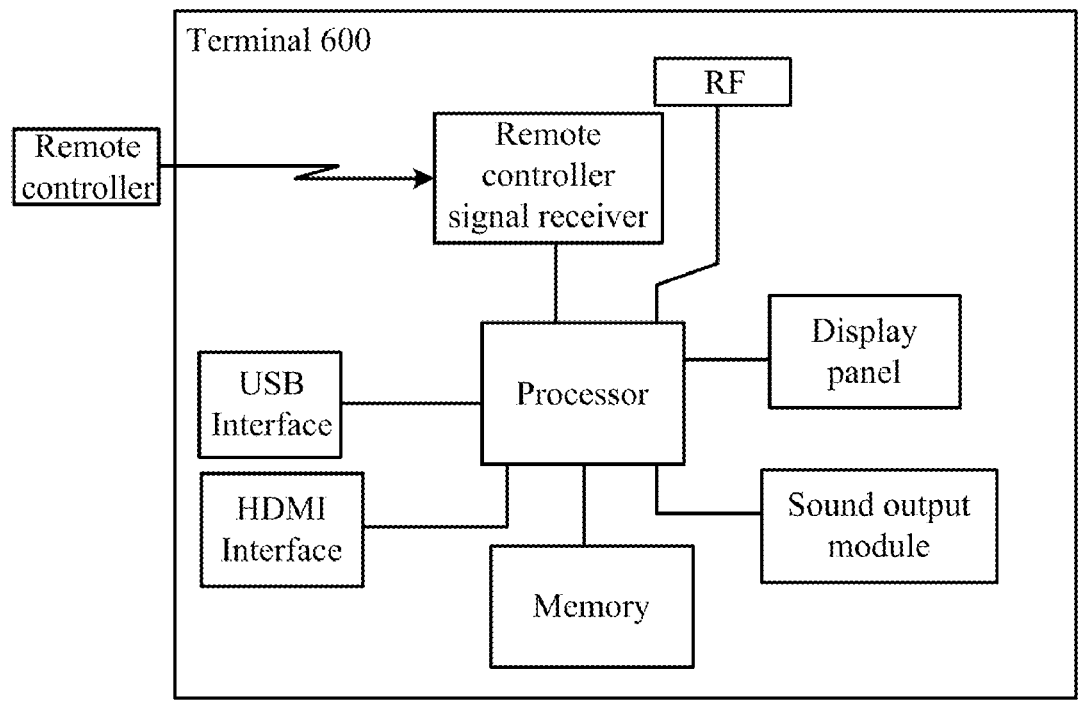
FIG. 6 is a schematic structural diagram of a terminal according to some embodiments of the disclosure.

As illustrated in FIG. 5, a terminal 600 according to some embodiments of the disclosure can include a memory, an input unit, an output unit, one or more processors, and other components. Those skilled in the art can appreciate that the display device will not be limited to the structure of the terminal illustrated in FIG. 6, but can include more or less components than those as illustrated or some of the components can be combined or different components can be arranged, where:

The memory can be configured to store software programs and modules, and the processor can be configured to run the software programs and modules stored in the memory to thereby perform various function applications and data processing. The memory can include a high-speed random access memory, and can further include a nonvolatile memory, e.g., at least one magnetic disk memory device, a flash memory device, or another volatile solid memory device. Moreover the memory can further include a memory controller configured to provide an access of the processor and the input unit to the memory.

The processor is a control center of the terminal 600, has the respective components of the entire terminal connected by various interfaces and lines, and runs or executes the software programs and/or the modules stored in the memory and invokes the data stored in the memory to perform the various functions of the terminal 600 and process the data to thereby manage and control the terminal as a whole. The processor can include one or more processing cores; and the processor can be integrated with an application processor and a modem processor, where the application processor generally handles the operating system, the user interfaces, the applications, etc., and the modem processor generally handles wireless communication. As can be appreciated, the modem processor may not be integrated into the processor.

The terminal 600 can include a TV and radio receiver, a High-Definition Multimedia (HDMI) interface, a USB interface, an audio and video input interface, and other input units, and the input units can further include a remote control receiver to receive a signal sent by a remote controller. Moreover the input units can further include a touch sensitive surface and other input devices, where the touch sensitive surface can be embodied in various types of resistive, capacitive, infrared, surface sound wave and other types, and the other input devices can include but will not be limited to one or more of a physical keyboard, functional keys (e.g., a volume control button, a power-on or-off button, etc.), a track ball, a mouse, a joystick, etc.

The output unit is configured to output an audio signal, a video signal, an alert signal, a vibration signal, etc. The output unit can include a display panel, a sound output module, etc. The display panel can be configured to display information input by a user or information provided to the user, and various graphic user interfaces of the terminal 600, where these graphic user interfaces can be composed of graphics, texts, icons, videos, and any combination thereof.

For example, the display panel can be embodied as a Liquid Crystal Display (LCD), an Organic Light-Emitting Diode (OLED), a flexible display, a 3D display, a CRT, a plasmas display panel, etc.

The terminal 600 can further include at least one sensor (not illustrated), e.g., an optical sensor, a motion sensor, and other sensors. Particularly the optical sensor can include an ambient optical sensor and a proximity sensor, where the ambient optical sensor can adjust the brightness of the display panel according to the luminosity of ambient light rays, and the proximity sensor can power off the display panel and/or a backlight when the terminal 600 moves to some position. The terminal 600 can be further configured with a gyroscope, a barometer, a hygrometer, a thermometer, an infrared sensor, and other sensors.

The terminal 600 can further include an audio circuit (not illustrated), and a speaker and a transducer can provide an audio interface between the user and the terminal 600. The audio circuit can convert received audio data into an electric signal, and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted to another terminal, for example, or the audio data is output to the memory or further processing. The audio circuit may further include an earphone jack for communication between a peripheral earphone and the terminal 600.

Moreover the terminal 600 can further include a Radio Frequency (RF) circuit. The RF circuit can be configured to receive and transmit a signal. Typically the RF circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the terminal 600 can further include a camera, a Bluetooth module, etc.

Moreover the terminal 600 further includes a Wireless Fidelity (WiFi) module (not illustrated). The WiFi is a technology of short-range wireless transmission, and the terminal 600 can assist the user in transmitting and receiving an email, browsing a web page, accessing streaming media, etc., and also provide the user with a wireless broadband access to the Internet, through the WiFi module. However it can be appreciated that the WiFi module may not necessarily be included in the terminal 600 but can be omitted as required without departing from the scope of the spirit of this disclosure.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:
1. A mobile terminal comprising:
a resolution determining unit configured to determine a first resolution of a target video frame input over a network, to compare the first resolution with a screen resolution of the mobile terminal, and to compare the first resolution with a resolution of a video frame currently displayed by the mobile terminal;
a scaling factor determining unit configured, when the first resolution is different from the screen resolution of the mobile terminal, to determine a first ratio of a row resolution of the screen resolution of the mobile terminal to a row resolution of the first resolution, and to determine a second ratio of a column resolution of the screen resolution of the mobile terminal to a column resolution of the first resolution;
a display window determining unit configured to determine a size of a display window according to a smaller one of the first ratio and the second ratio, which is a display scale, and the first resolution;
a displaying unit configured to display the target video frame in the display window; and
a camera unit configured to acquire an image; wherein:
the resolution determining unit is further configured to determine an image acquisition resolution of the camera unit according to the first resolution;
the scaling factor determining unit is further configured to determine a third ratio of a row resolution of a resolution of a local video preview window to a row resolution of the image acquisition resolution, and to determine a fourth ratio of a column resolution of the resolution of the local video preview window to a column resolution of the image acquisition resolution;

the display window determining unit is further configured to determine a size of the local video preview window according to a smaller one of the third ratio and the fourth ratio, and the image acquisition resolution; and the displaying unit is further configured to display the image acquired by the camera unit in the local video preview window.

2. The mobile terminal according to claim 1, wherein the display window determining unit is further configured to determine the size of the display window as the screen resolution of the mobile terminal when the first resolution is the same as the screen resolution of the mobile terminal.

3. The mobile terminal according to claim 1, wherein the display window determining unit is further configured to determine the size of the display window as the size of a display window displaying the currently displayed video frame when the first resolution is the same as the resolution of the currently displayed video frame.

4. The mobile terminal according to claim 1, wherein the scaling factor determining unit configured to determine the first ratio and the second ratio is configured:

to divide the row resolution of the screen resolution in the current display mode of the mobile terminal by the row resolution of the first resolution to obtain the first ratio; and to divide the column resolution of the screen column resolution in the current display mode of the mobile terminal by the column resolution of the first resolution to obtain the second ratio;

wherein the display mode comprises a landscape display mode and a portrait display mode.

5. The mobile terminal according to claim 1, wherein the display window determining unit configured to determine the size of the display window is configured:

to multiply the display scale respectively with the row resolution and the column resolution in the first resolution of the target video frame to obtain the size of the display window of the target video frame.

6. The mobile terminal according to claim 1, wherein the display window determining unit is further configured to adjust the display window to the middle of the screen of the mobile terminal, and is configured:

to locate a position, where a first row of pixels of the target video frame is displayed, in a X-th row of the screen in the current display mode of the mobile terminal, wherein:

$$X = \frac{A-B}{2} + 1,$$

wherein A represents the column resolution of the screen in the current display mode of the mobile terminal, and B represents the column resolution of the determined display window; and to locate a position, where a first column of pixels of the target video frame is displayed, in a Y-th column of the screen in the current display mode of the mobile terminal, wherein:

$$Y = \frac{C-D}{2} + 1,$$

wherein C represents the row resolution of the screen in the current display mode of the mobile terminal, and D represents the row resolution of the display window;

wherein the display mode comprises a landscape display mode and a portrait display mode.

7. The mobile terminal according to claim 1, wherein:

the scaling factor determining unit configured to determine the third ratio and the fourth ratio is configured:

to divide the row resolution of the local video preview window in the current display mode by the row resolution of the image acquisition resolution to obtain the third ratio; and to divide the column resolution of the local video preview window in the current display mode by the column resolution of the image acquisition resolution to obtain the fourth ratio;

wherein the display mode comprises a landscape display mode and a portrait display mode.

8. The mobile terminal according to claim 1, wherein the display window determining unit is configured to determine the size of the local video preview window, and is configured:

to multiply the third and fourth ratios respectively with the row resolution and the column resolution of the resolution of the local video preview window to obtain the size of the local video preview window.

9. A method for displaying a video over a network, the method comprising:

determining, by a resolution determining unit, a first resolution of a target video frame input over the network, comparing the first resolution with a screen resolution of a mobile terminal, and comparing the first resolution with a resolution of a video frame currently displayed by the mobile terminal;

when the first resolution is different from the screen resolution of the mobile terminal, determining, by a scaling factor determining unit, a first ratio of a row resolution of the screen resolution of the mobile terminal to a row resolution of the first resolution, and a second ratio of a column resolution of the screen resolution of the mobile terminal to a column resolution of the first resolution;

determining, by a display window determining unit, a size of a display window according to a smaller one of the first ratio and the second ratio, which is a display scale, and the first resolution;

displaying the target video frame in the display window;

determining, by the resolution determining unit, an image acquisition resolution of the mobile terminal according to the first resolution;

when the first resolution is different from the screen resolution of the mobile terminal, determining, by the scaling factor determining unit, a third ratio of a row resolution of a resolution of a local video preview window to a row resolution of the image acquisition resolution, and a fourth ratio of a column resolution of the resolution of the local video preview window to a column resolution of the image acquisition resolution;

determining, by the display window determining unit, a size of the local video preview window according to a smaller one of the third ratio and the fourth ratio, and the image acquisition resolution; and displaying an image acquired by a camera unit in the local video preview window.

10. The method according to claim 9, wherein the method further comprises:

when the first resolution is the same as the screen resolution of the mobile terminal, determining the size of the display window as the screen resolution of the mobile terminal.

11. The method according to claim 9, wherein the method further comprises:
when the first resolution is the same as the resolution of the currently displayed video frame, determining the size of the display window as the size of a display window displaying the currently displayed video frame.

12. The method according to claim 9, wherein determining the first ratio of the row resolution of the screen resolution of the mobile terminal to the row resolution of the first resolution, and comparing the second ratio of the column resolution of the screen resolution of the mobile terminal to the column resolution of the first resolution comprises:
dividing the row resolution of the screen resolution in the current display mode of the mobile terminal by the row resolution of the target video frame to obtain the first ratio; and
dividing the column resolution of the screen resolution in the current display mode of the mobile terminal by the column resolution of the target video frame to obtain the second ratio;
wherein the display mode comprises a landscape display mode and a portrait display mode.

13. The method according to claim 9, wherein determining the size of the display window according to the smaller one of the first ratio and the second ratio, which act as the display scale, and the first resolution comprises:
multiplying the display scale respectively with the row resolution and the column resolution in the first resolution of the target video frame to obtain the size of the display window of the target video frame.

14. The method according to claim 9, wherein the method further comprises:
adjusting the display window to the middle of the screen of the mobile terminal by:
locating a position, where a first row of pixels of the target video frame is displayed, in a X-th row of the screen in the current display mode of the mobile terminal, wherein:

$$X = \frac{A-B}{2} + 1,$$

wherein A represents the column resolution of the screen in the current display mode of the mobile terminal, and B represents the column resolution of the determined display window; and
locating a position, where a first column of pixels of the target video frame is displayed, in a Y-th column of the screen in the current display mode of the mobile terminal, wherein:

$$Y = \frac{C-D}{2} + 1,$$

wherein C represents the row resolution of the screen in the current display mode of the mobile terminal, and D represents the row resolution of the display window;
wherein the display mode comprises a landscape display mode and a portrait display mode.

15. The method according to claim 9, wherein determining the third ratio of the row resolution of the resolution of the local video preview window to the row resolution of the image acquisition resolution, and determining the fourth ratio of the column resolution of the resolution of the local video preview window to the column resolution of the image acquisition resolution comprises:
dividing the row resolution of the local video preview window in the current display mode by the row resolution of the image acquisition resolution to obtain the third ratio; and
dividing the column resolution of the local video preview window in the current display mode by the column resolution of the image acquisition resolution to obtain the fourth ratio;
wherein the display mode comprises a landscape display mode and a portrait display mode; and
determining the size of the local video preview window according to the smaller one of the third ratio and the fourth ratio, and the image acquisition resolution comprises:
multiplying the third and fourth ratios respectively with the row resolution and the column resolution of the resolution of the local video preview window to obtain the size of the local video preview window.

* * * * *